UNITED STATES PATENT OFFICE.

J. F. SHELDEN, OF ABINGDON, ILLINOIS.

IMPROVEMENT IN REFINING SORGHUM JUICE AND SIRUP.

Specification forming part of Letters Patent No. 40,544, dated November 3, 1863; Reissue No. 1,667, dated May 10, 1864.

*To all whom it may concern:*

Be it known that I, J. F. SHELDEN, of Abingdon, in the county of Knox and State of Illinois, have invented a new and useful Improvement in Process for Refining Sorghum Juice or Sirup and Manufacturing the Same into Sugar; and I do hereby declare the following to be a full, clear, and exact description thereof.

The nature of my invention consists in treating the juice or sirup, when cool or only moderately warm, with soda or other suitable alkaline substance in the manner hereinafter described. In addition to the soda a small quantity of cream of tartar and milk may be used, if desired, although the soda is the important agent in the process.

To enable those skilled in the art to understand and use my invention, I will now describe the same with particularity.

The juice is first treated, either when cold or when warm, (the temperature should not, however, rise to scalding-heat, and the result is better when the juice is cool,) with soda or other alkaline substance, in the proportion of one pound of soda to one hundred and twenty gallons of the juice, or thereabout. The soda should be thoroughly stirred into the juice and allowed to stand for an hour or two, when it may be put into the pans and evaporated. When the juice first boils by the action of the soda upon the same, the glutinous or gummy substance is set free and rises in the form of scum to the top, whence it is readily removed. As it is this glutinous substance which prevents the granulation of the sirup into sugar, and as it can be much more easily separated from the juice than from the sirup after boiling, it follows not only that the application of soda is important in its effect of separating and removing the glutinous substance aforesaid, but that a much better result is attained and a much greater quantity of sugar produced by treating the juice with the soda rather than the sirup, although the result is the same in kind in either case. After the juice is boiled down into sirup of a proper consistency, it should be set away in a dry place, and may be stirred each day, and in the course of one or two months a large portion will have become granulated into very fine and well-flavored sugar, when by draining off the remaining sirup or molasses the sugar is obtained in a dry and granulated state.

In some cases a slightly beneficial result may be obtained by the employment, in combination with the soda, of cream of tartar and milk, in the proportion of one ounce of cream of tartar and two quarts of milk to one hundred and twenty gallons of the juice.

The sirup may be treated with soda, also, by using in the proportion of one pound of soda to twenty gallons of sirup; and if the cream of tartar and milk are used, an ounce of the former and two quarts of the latter to the same quantity. It is better, however, to treat the juice before evaporating, for the reason that the skimming may there be all done substantially at once when the juice begins to boil, and thus much labor and waste is avoided. Furthermore, a much greater proportion of the sirup will granulate into sugar when the juice is treated, as the defecation is much more complete in that case than when the sirup is treated.

I am aware that various experiments have been made in treating both the juice and sirup with lime. I therefore do not claim the use of lime in neutralizing the acidity in sorghum juice or sirup in my process of clarifying the same and manufacturing sugar therefrom.

Having now described my invention, I will proceed to specify what I claim and desire to secure by Letters Patent.

1. Treating the juice and sirup with soda or other equivalent substance, in the manner and for the purposes specified.

2. Treating the juice or sirup with soda, cream of tartar, and milk, or their equivalents, as and for the purposes set forth.

J. F. SHELDEN.

Witnesses:

W. E. MARRS,

L. L. COBURN.